United States Patent
Suzuki

(10) Patent No.: US 8,767,678 B2
(45) Date of Patent: Jul. 1, 2014

(54) HANDOVER CONTROL DEVICE, METHOD, AND PROGRAM

(75) Inventor: Takehiro Suzuki, Minato-ku (JP)

(73) Assignee: NEC Corporation, Tokyo (JP)

( * ) Notice: Subject to any disclaimer, the term of this patent is extended or adjusted under 35 U.S.C. 154(b) by 258 days.

(21) Appl. No.: 12/300,587

(22) PCT Filed: May 21, 2008

(86) PCT No.: PCT/JP2008/059335
§ 371 (c)(1),
(2), (4) Date: Nov. 12, 2008

(87) PCT Pub. No.: WO2008/143282
PCT Pub. Date: Nov. 27, 2008

(65) Prior Publication Data
US 2010/0172320 A1    Jul. 8, 2010

(30) Foreign Application Priority Data
May 22, 2007  (JP) .................................. 2007-135694

(51) Int. Cl.
*H04W 4/00* (2009.01)
*H04W 36/00* (2009.01)
*H04W 36/30* (2009.01)

(52) U.S. Cl.
CPC .......... *H04W 36/0083* (2013.01); *H04W 36/30* (2013.01); *H04W 36/0061* (2013.01); *H04W 36/0016* (2013.01)
USPC .......................................... 370/332; 455/439

(58) Field of Classification Search
None
See application file for complete search history.

(56) References Cited

U.S. PATENT DOCUMENTS

| 2004/0048616 | A1 * | 3/2004 | Kobylinski et al. ........... 455/436 |
| 2004/0106421 | A1 * | 6/2004 | Tomiyoshi et al. .......... 455/509 |
| 2006/0030323 | A1 | 2/2006 | Ode et al. |
| 2007/0135125 | A1 * | 6/2007 | Kim et al. ..................... 455/436 |

FOREIGN PATENT DOCUMENTS

| CN | 1187281 A | 7/1998 |
| EP | 1418784 A1 | 5/2004 |
| TW | 2004-00728 A | 1/2004 |
| TW | 2007-04021 A | 1/2007 |
| TW | 2007-04215 A | 1/2007 |
| WO | 2004/112419 A1 | 12/2004 |
| WO | 2005/032185 A1 | 4/2005 |

OTHER PUBLICATIONS

Office Action dated Jun. 22, 2011, in counterpart Chinese Application No. 200880000228.3.
Communication from the European Patent Office issued Mar. 20, 2013 in counterpart European Application No. 08799816.7.
Office Action issued Feb. 1, 2012 by the Taiwanese Patent Office in counterpart Taiwanese Application No. 097116469.

* cited by examiner

*Primary Examiner* — Yemane Mesfin
*Assistant Examiner* — Christine Duong
(74) *Attorney, Agent, or Firm* — Sughrue Mion, PLLC

(57) ABSTRACT

A handover control device that conducts switching-over base station(s), in which a mobile station $11_1, \ldots, 1N_Q$ communicates, from one base station to another neighboring base station wherein a gateway server 30 monitors communication quality of the mobile station $11_1, \ldots, 1N_Q$ at a frequency according to a service level assigned to the mobile station $11_1, \ldots, 1N_Q$ and, if the communication quality falls below a predetermined quality, sends information on the another base station to the mobile station $11_1, \ldots, 1N_Q$.

7 Claims, 5 Drawing Sheets

FIG. 3

|   | MAC ADDRESS | SERVICE LEVEL |
|---|---|---|
| 1 | xx xx xx xx xx xx xx | HIGH |
| 2 | yy yy yy yy yy yy yy | MID |
| ... | ... | ... |
| n | zz zz zz zz zz zz zz | LOW |

HANDOVER CONTROL DEVICE, METHOD, AND PROGRAM

CROSS-REFERENCE TO RELATED APPLICATIONS

This application is based upon and claims the benefit of the priority of Japanese patent application No. 2007-135694 filed on May 22, 2007, the disclosure of which is incorporated herein in its entirety by reference thereto.

TECHNICAL FIELD

The present invention relates to a handover control device, method, and program.

BACKGROUND ART

Recently, attention has been paid to a WiMAX (Worldwide Interoperability for Microwave Access) system as a mobile communication system. The WiMAX system covers a radius of about 50 Km with one wireless LAN access point and allows for a maximum communication speed of 70 Mbps.

FIG. 1 is a diagram showing the configuration of a WiMAX system. The WiMAX system comprises mobile stations $11_1, \ldots, 1N_Q$, base stations $11, \ldots, 1N$, an ASN-GW (Access Service Network Gateway) 30, and an AAA (Authentication Authorization, Accounting) server 40.

The ASN-GW 30 manages and controls the hierarchically lower base stations $11, \ldots, 1N$ and mobile stations $11_1, \ldots, 1N_Q$ that are connected to it.

The AAA server 40 performs authentication, authorization, and accounting of the mobile stations $11_1, \ldots, 1N_Q$.

The mobile stations $11_1, \ldots, 11_p$ represent the mobile stations that are in the range of the base station 11, and mobile stations $1N_1, \ldots, 1N_Q$ represent the mobile stations that are under entry to (i.e., in the range of) the base station 1N.

In the conventional WiMAX system, the ASN-GW 30 requests the AAA server 40 to authenticate a mobile station that attempts an entry to (i.e., to enter the range of) a base station. The ASN-GW 30 also sends the base station information, collected from the hierarchically lower base stations $11, \ldots, 1N$, to the mobile stations $11_1, \ldots 1N_Q$ as the neighboring base station information at a fixed time interval.

Patent Document 1 discloses a technology that allows a base station device to monitor the reception status of mobile stations, to detect a mobile station on which a call-loss or quality degradation occurs, and to cause the mobile station to handover to another base station device that has a carrier frequency different from that of the current base station device.

Patent Document 1: WO2004/112419

DISCLOSURE OF THE INVENTION

Problems to be Solved by the Invention

The entire disclosure of Patent Document 1 is incorporated herein by reference thereto.

The following analysis has been given according to the present invention.

When a gateway server such as the ASN-GW 30 described above monitors not only the base stations but also the link status of mobile stations, the processing load of the gateway server is increased and the performance of the whole WiMAX system is degraded. In fact, because the gateway server sends data in the unicast mode to acquire the link status of mobile stations, the gateway server's processing load involved in acquiring the link status of mobile stations is increased as the number of monitored mobile stations is increased.

According to the technology disclosed in Patent Document 1, the load of a base station device involved in monitoring mobile stations is also increased as the number of mobile stations is increased.

However, if the gateway server (or base station device) does not monitor the link status of mobile stations to avoid this condition, a mobile station cannot acquire the latest neighboring base station information immediately before a handover and, as a result, handover quality is degraded.

Therefore, the problem to be solved is to increase handover quality while preventing an increase in the processing load of the gateway server.

Means to Solve the Problems

A handover control device in accordance with a first aspect of the present invention is a handover control device that switches-over base station(s), with which mobile station(s) communicates, from one base station to another (for example, neighboring) base station wherein the handover control device comprises a gateway server configured to monitor communication quality of the mobile station at a frequency according to a service level assigned to the mobile station and, if the communication quality falls below a predetermined quality, to send information on the another base station to the mobile station.

A handover control method in accordance with a second aspect of the present invention is a handover control method for switching-over base station(s), with which mobile station(s) communicates, from one base station to another base station (for example, a neighboring base station), comprising: monitoring communication quality of the mobile station at a frequency according to a service level assigned to the mobile station; and, if the communication quality falls below a predetermined quality, sending information on the another base station to the mobile station.

A handover control program in accordance with a third aspect of the present invention is a handover control program that causes a computer to perform processing for switching-over base station(s), with which mobile station(s) communicates, from one base station to another base station (for example, a neighboring base station), the program causing the computer to perform processing for monitoring a communication quality of the mobile station at a frequency according to a service level assigned to the mobile station; and, if the communication quality falls below a predetermined quality, processing for sending information on the another base station to the mobile station.

Meritorious Effects of the Invention

The handover control device of the present invention allows a mobile station to acquire neighboring base station information at a time that is closer to the timing of a handover than in the conventional system, thus increasing handover quality.

In addition, the handover processing [sic. control] device of the present invention monitors mobile stations at a frequency according to a service level assigned to each mobile station. So, the processing load of the gateway server is reduced as compared to the case where all mobile stations are monitored at a fixed frequency.

BRIEF DESCRIPTION OF THE DRAWINGS

FIG. 3 is a diagram showing service levels stored in a service level management unit in a handover control device in an exemplary embodiment of the present invention.

EXPLANATION OF REFERENCE SIGNS

Figure 1:
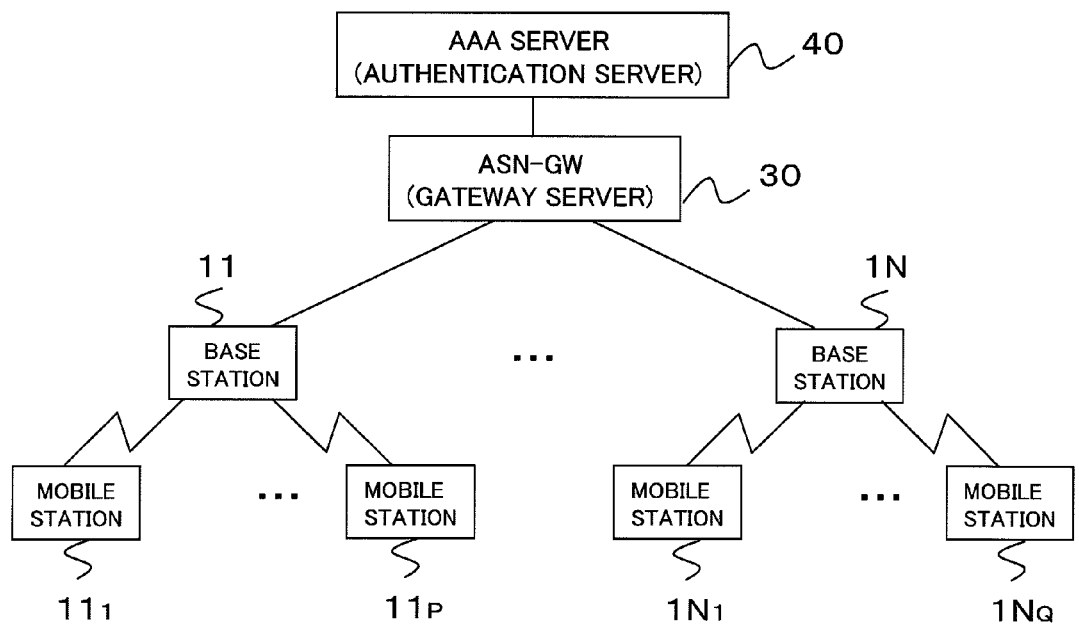
FIG. 1 is a diagram showing a configuration of a handover control system.

11, ..., 1N Base station
$11_1, \ldots, 11_P, 1N_1 \ldots 1N_Q$ Mobile station
30 ASN-GW (gateway server)
40 AAA server (authentication server)
301 Service level management unit
302 Link status acquisition unit
303 Neighboring base station information sending/receiving unit
304 Base station side sending/receiving unit
305 AAA server side sending/receiving unit

PREFERRED MODES FOR CARRYING OUT THE INVENTION

As for a handover control device in a first development mode in the handover control device in the first aspect described above, the communication quality is preferably at least one of an uplink CINR and a downlink CINR.

As for a handover control device in a second development mode in the handover control device in the first aspect described above, it is preferred to comprise an authentication server configured to store the service level and to send the stored service level to the gateway server.

As for a handover control device in a third development mode in the handover control device in the first aspect described above, the handover control device is preferably configured to send the service level in an access accept packet when the authentication server sends the service level to the gateway server.

As for a handover control device in a fourth development mode in the handover control device in the first aspect described above, it is preferred to comprise a storage device in which records each including an identifier of the mobile station and the service level assigned to the mobile station are stored.

Referring to FIG. 1, a handover control device in an exemplary embodiment of the present invention, which is a handover control device for controlling the mobile stations and the base stations making up the WiMAX system, comprises an ASN-GW (Gateway Server) 30 and an AAA server (Authentication Server) 40 that performs authentication, authorization, and accounting.

The AAA server 40 stores a service level for each of the mobile stations and embeds the service level of a mobile station in an access accept packet, generated after the successful authentication of the mobile station, as its attribute value to notify the service level to the ASN-GW 30.

The service level means the quality of service provided to an end user, for example, the quality of a handover provided to the user of a terminal station. Good handover quality means that a momentary communication interruption will less likely to occur during a handover.

The ASN-GW 30 changes the monitoring frequency of a mobile station according to the service level. It is preferable that the ASN-GW 30 delivers the neighboring base station information at a time interval shorter than the interval at which the neighboring base station information is delivered regularly in the conventional system. This is because providing the neighboring base station information, generated at a time closer to the timing of a handover, to a mobile station as a handover candidate increases handover quality.

The ASN-GW 30 stores the service level of each of the mobile stations received from the AAA server 40. The ASN-GW 30 acquires the link status of a mobile station at a time interval that depends on (i.e., is specified according to) the service level. A concrete example of the link status is an uplink CINR(Carrier-to-Interference-Noise Ratio) or a downlink CINR.

The ASN-GW 30 references the link status and determines if sufficient communication quality is ensured. If sufficient communication quality is not ensured, the ASN-GW 30 sends base station information indicating a handover candidate managed by the ASN-GW 30 as latest neighboring base station information to a base station to which the mobile station belongs.

The mobile station that is going to make a handover can receive the neighboring base station information, which indicates a handover candidate, via the base station to which the mobile station currently belongs.

Therefore, the method of the present invention provides handover quality higher than that of the conventional method in which the neighboring base station information is received regularly from the ASN-GW 30.

It is preferable that the service level be allocated to each of the mobile stations and that the ASN-GW 30 ask a mobile station(s) with a higher service level about its link status more frequently.

The method described above reduces the processing load of the ASN-GW 30 as compared with the method in which the link status is acquired equally from all mobile stations.

In addition, assigning a service level of a handover to each mobile station allows for more diversified services to the end users.

Exemplary Embodiments

Referring to FIG. 1, an AAA server 40 stores a user ID, a password, and a service level, which is allocated to the user, as user information required to participate in the WiMAX system. The AAA server 40 authenticates mobile stations $11_1, \ldots, 1N_Q$ and sends access accept packets to an ASN-GW 30 as a notification indicating successful authentication.

At this time, the service level of a mobile station that has been successfully authenticated can be embedded into an access accept packet as an attribute value as defined in RFC3580.

Figure 2:
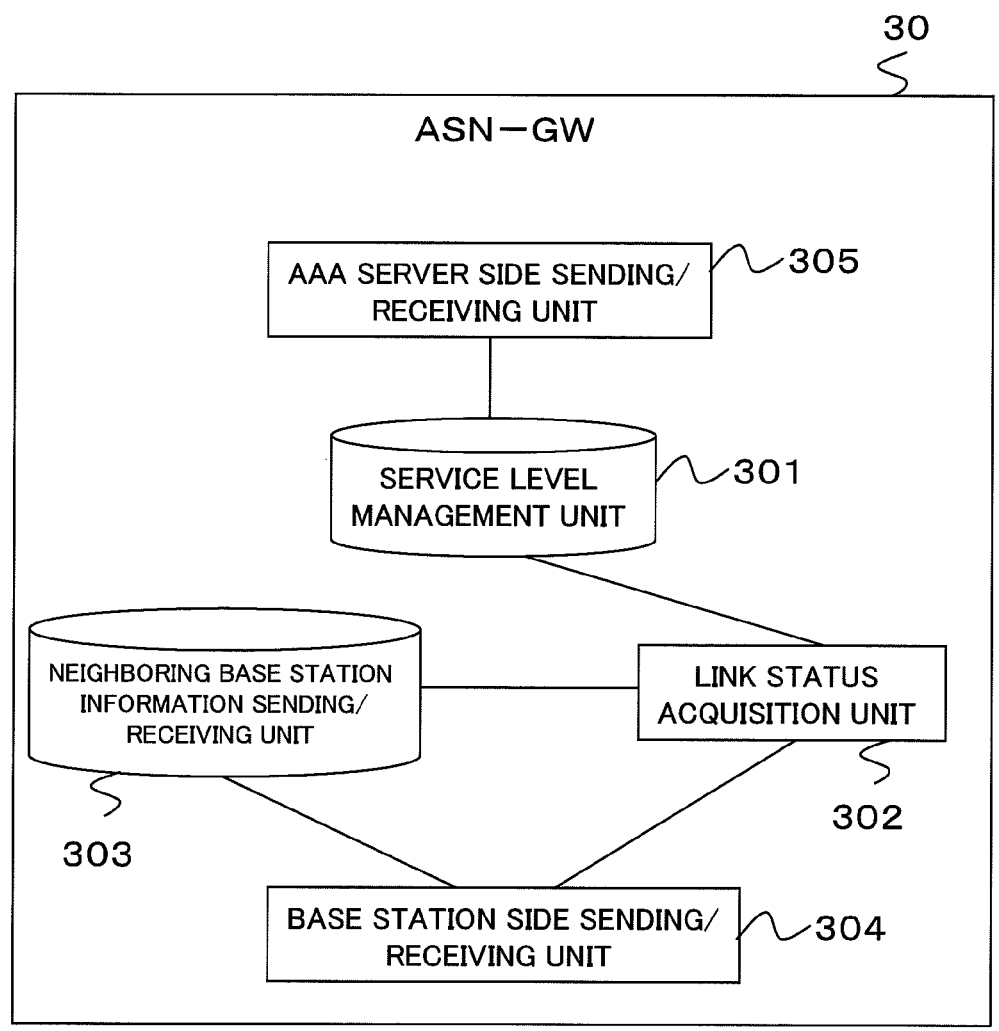
FIG. 2 is a diagram showing a configuration of an ASN-GW in a handover control device in an exemplary embodiment of the present invention.

FIG. 2 is a diagram showing a configuration of the ASN-GW 30 that is included in a handover control device in a first exemplary embodiment of the present invention.

The ASN-GW 30 comprises a service level management unit 301, a link status acquisition unit 302, a neighboring base station information sending/receiving unit 303, a base station side sending/receiving unit 304, and an AAA server side sending/receiving unit 305.

Referring to FIG. 2, the service level management unit 301 included in the ASN-GW 30 integrally manages the service levels, received from the AAA server 40 via the AAA server side sending/receiving unit 305, as well as the MAC addresses of mobile stations.

FIG. 3 is a diagram showing an example of the data format of service levels stored in the service level management unit 301. As shown in FIG. 3, HIGH is assigned to a user with a highest service level, MID is assigned to a user with a second highest service level, and LOW is assigned to a user with a third highest service level.

The AAA server side sending/receiving unit 305 is an interface with the AAA server 40.

When a service level is received from the AAA server 40, the service level management unit 301 notifies the service level to the link status acquisition unit 302.

The link status acquisition unit 302 stores in advance a link status acquisition interval and a link status threshold corresponding to a service level and, when a service level is received, acquires the link status regularly based on the link status acquisition interval.

The link status acquisition unit 302 references the acquired link status and, when it is determined that the link status of the mobile station is smaller than a predetermined threshold, requests the neighboring base station information sending/receiving unit 303 to send the latest neighboring base station information to the base station to which the mobile station belongs.

The neighboring base station information sending/receiving unit 303 sends the neighboring base station information to the base station via the base station side sending/receiving unit 304.

The neighboring base station information sending/receiving unit 303 collects radio resource information from the hierarchically lower base stations, regularly sends the collected information to those base stations and, when an instruction is received from the link status acquisition unit 302, sends the neighboring base station information to the hierarchically lower base station.

The base station side sending/receiving unit 304 is an interface for communicating with the base stations 11, ..., 1N.

Figure 4:
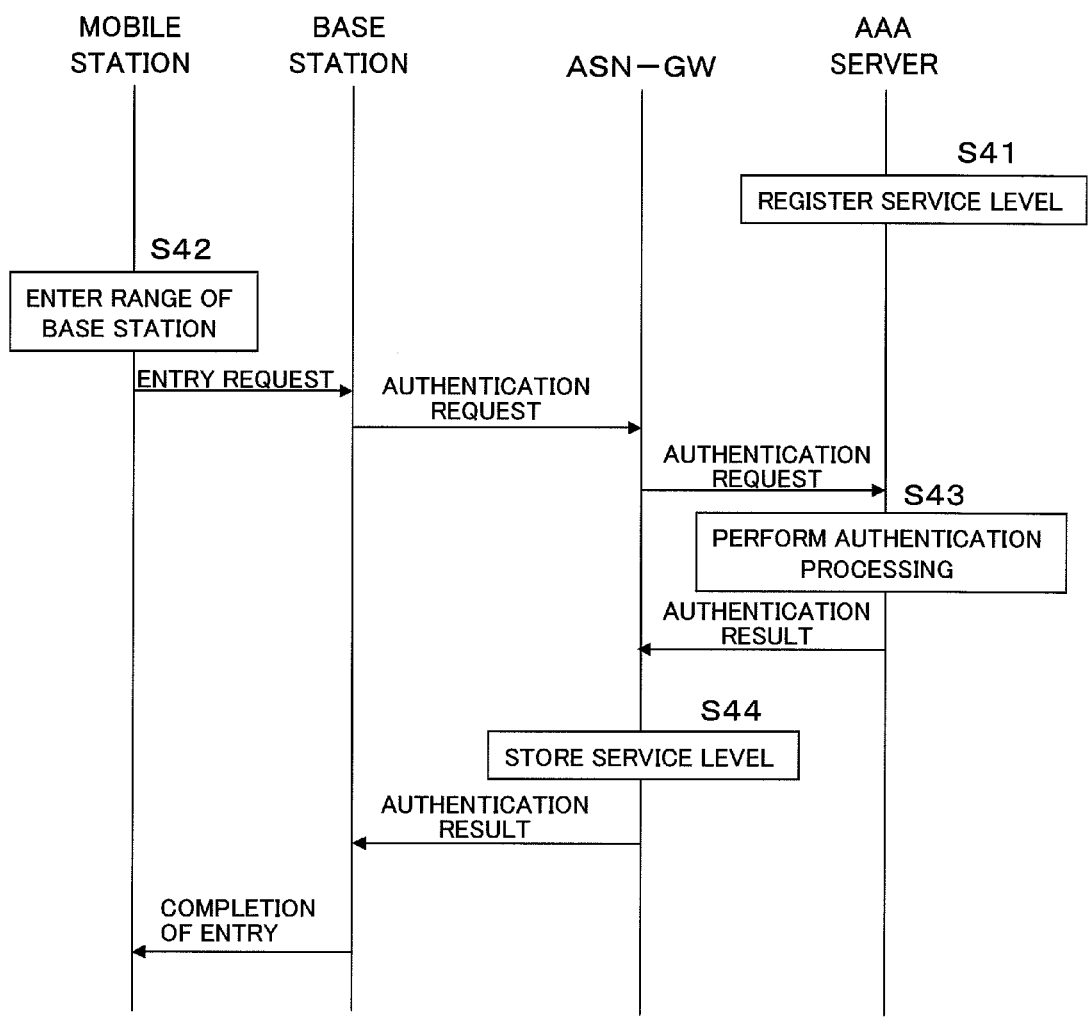
FIG. 4 is a diagram showing a sequence of a handover control method in an exemplary embodiment of the present invention.

Referring to the sequence diagram shown in FIG. 4, the following describes the processing from a time the mobile station $11_1$ enters the range of the base station 11 to a time a service level is assigned by the AAA server 40.

The AAA server 40 stores a user ID and a password for authenticating a user who will participate in the system. In addition, the AAA server 40 registers the correspondence between user IDs and service levels of the users (step S41). For example, HIGH may be assigned to users with the highest service level, MID may be assigned to users with the second highest service level, and LOW may be assigned to users with the third highest service level (see FIG. 3).

The mobile station $11_1$ enters the range of the base station 11 (step S42). The base station 11 receives an entry request from the mobile station $11_1$ and sends an authentication request to the ASN-GW 30.

The ASN-GW 30 receives the authentication request and transfers it to the AAA server 40.

The AAA server 40 receives the authentication request issued from the mobile station $11_1$ and performs authentication processing (step S43).

After the authentication processing, the AAA server 40 embeds the service level of the mobile station $11_1$ into an access accept packet and sends it to the ASN-GW 30.

The service level management unit 301 included in the ASN-GW 30 stores the service level along with the correspondence between the MAC address of the mobile station $11_1$ and the service level as shown in FIG. 3 (step S44).

The ASN-GW 30 notifies the authentication result to the base station 11, and the base station 11 notifies the mobile station $11_1$ that the entry has been completed.

Figure 5:
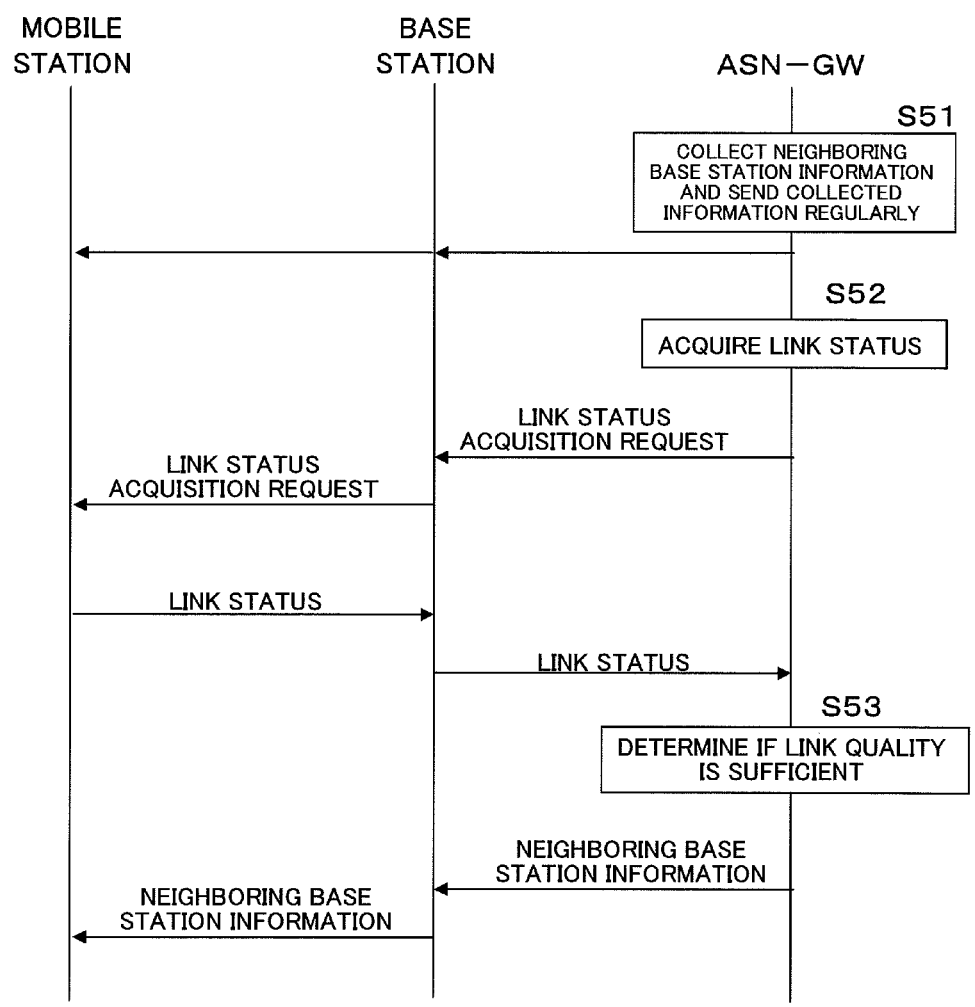
FIG. 5 is a diagram showing the sequence of a handover control method in an exemplary embodiment of the present invention.

Next, referring to the sequence diagram in FIG. 5, the following describes the flow of the processing in which, after the mobile station $11_1$ has completed the entering into (i.e., entered the range of) the base station 11, the ASN-GW 30 transfers information (neighboring base station information) on an appropriate handover candidate to the mobile station $11_1$.

The neighboring base station information sending/receiving unit 303 of the ASN-GW 30 collects base station information from the hierarchically lower base stations 11, ..., 1N and sends the collected base station information to the base stations 11, ..., 1N at a fixed time interval as the neighboring base station information (step S51). This method corresponds to the conventional method of sending the neighboring base station information.

The link status acquisition unit 302 of the ASN-GW 30 acquires the link status of the mobile station $11_1$ at a fixed time interval according to the service level of the mobile station $11_1$ notified by the service level management unit 301 (step S52).

The link status acquisition request is sent to the mobile station $11_1$ via the base station 11, and the mobile station $11_1$ sends the link status to the ASN-GW 30 via the base station 11.

For example, the time interval is 30 seconds when the service level is HIGH, 300 seconds (five minutes) when the service level is MID, and 600 seconds (ten minutes) when the service level is LOW.

The link status acquisition unit 302 determines if the quality of the link status of the mobile station $11_1$, acquired in step S52, is sufficiently high (step S53).

If it is determined that the link quality is not sufficient, the link status acquisition unit 302 requests the neighboring base station information sending/receiving unit 303 to send neighboring base station information to the mobile station $11_1$.

The mobile station $11_1$ receives the latest neighboring base station information immediately before the handover so that it can select a handover candidate base station correctly and smoothly.

When neighboring base station information on a handover candidate is sent to a mobile station in the conventional WiMAX system, the ASN-GW 30 used to send the neighboring base station information to the mobile station regularly (step S51).

This means that, when the mobile station moves and the link quality is degraded, the mobile station cannot acquire the neighboring base station information generated immediately before a handover.

The ASN-GW 30 could get information on the link status of each of the mobile stations in the unicast mode in the conventional WiMAX system. However, if the link status is acquired from all hierarchically lower mobile stations in the unicast mode, there is a possibility that the load of the ASN-GW 30 becomes too heavy and, in addition, the communication load of the whole system is increased.

In contrast, this exemplary embodiment introduces the service level of handover into each of the mobile stations to vary the time interval at which the link status is to be acquired from each mobile station, thereby suppressing an increase in the load of the ASN-GW 30 and in the communication amount of the whole system.

The handover processing device in this exemplary embodiment allows a mobile station to acquire the base station information on a handover candidate at a time closer to the timing of the handover than in the conventional system.

For example, the function of the AAA server 40 in the WiMAX system may also be used as a method for introducing service levels on a mobile station basis. To do so, the handover device in the exemplary embodiment of the present invention may be implemented based only on the device configuration of the conventional WiMAX system without introducing an additional device. In addition, since this method requires the user only to perform ordinary AAA authentication, it doesn't need a special application or device.

Although only one ASN-GW 30 is used in the above exemplary embodiment, two or more ASN-GWs may also be used.

Introducing a service level into each of the mobile stations also allows the ASN-GW 30 to monitor and control the link status of the mobile stations. That is, it is also possible that the ASN-GW 30 issues a handover request to a mobile station that cannot acquire sufficient communication quality instead of issuing a handover request by the mobile station as an initiating station.

The exemplary embodiment or the examples may be changed or adjusted within the scope of all disclosures (including claims) of the present invention and based on its basic technological concept. In addition, the disclosed elements may be combined or selected in various ways within the scope of the claims of the present invention.

The invention claimed is:

1. A handover control device that switches-over from one base station with which a mobile station communicates to another base station comprising:
   a gateway server configured to
      monitor communication quality of said mobile station and to send information on said another base station to said mobile station; and
      receive service level stored in an authentication server configured to store the service level;
   wherein said gateway server monitors the communication quality of the mobile station at a frequency according to the service level assigned to said mobile station and, if the communication quality falls below a predetermined quality, sends the information on said another base station to said mobile station as a candidate for a handover.

2. The handover control device as defined by claim 1 wherein the communication quality is an uplink or downlink CINR (Carrier-to-Interference-Noise Ratio).

3. The handover control device as defined by claim 1, wherein the service level is sent in an access accept packet when said authentication server sends the service level to said gateway server.

4. The handover control device as defined by claim 1, wherein the authentication server is further configured to store records of an identifier of said mobile station and the service level assigned to said mobile station.

5. A mobile communication system comprising said handover control device as defined by claim 1 and said base stations.

6. A handover control method for switching-over from one base station with which a mobile station communicates to another base station, comprising:
   monitoring communication quality of said mobile station at a frequency according to a service level assigned to said mobile station by a handover control device;
   if the communication quality falls below a predetermined quality, sending information on said another base station to said mobile station by said handover control device as a candidate for a handover; and
   storing the service level at an authentication server and sending the stored service level to said handover control device.

7. A non-transitory computer readable medium having stored thereon a handover control program that causes a computer to perform processing for switching-over from one base station with which a mobile station communicates to another base station, said program causing said computer to perform:
   monitoring a communication quality of said mobile station at a frequency according to a service level assigned to said mobile station;
   if the communication quality falls below a predetermined quality, sending information on said another base station to said mobile station as a candidate for a handover; and
   storing the service level at an authentication server and sending the stored service level to a handover control device.

* * * * *